(12) United States Patent
Soliman

(10) Patent No.: US 6,490,460 B1
(45) Date of Patent: Dec. 3, 2002

(54) FORWARD AND REVERSE LINK POWER CONTROL USING POSITION AND MOBILITY INFORMATION

(75) Inventor: Samir S. Soliman, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/204,026

(22) Filed: Dec. 1, 1998

(51) Int. Cl.$^7$ ............................. H04B 7/00; H04Q 7/20
(52) U.S. Cl. ..................... 455/522; 455/69; 455/441
(58) Field of Search ................. 455/456, 135, 455/522, 277.1, 69, 67.3, 27, 70, 343, 277.2, 441, 436, 440; 375/200

(56) References Cited

U.S. PATENT DOCUMENTS

| | | | |
|---|---|---|---|
| 5,067,171 A | * 11/1991 | Kawano ..................... 455/436 |
| 5,239,667 A | * 8/1993 | Kanai ......................... 455/10 |
| 5,305,468 A | * 4/1994 | Bruckert et al. ............. 455/69 |
| 5,465,399 A | 11/1995 | Oberholtzer et al. |
| 5,594,946 A | * 1/1997 | Menich et al. .............. 455/522 |
| 5,603,096 A | * 2/1997 | Gilhousen et al. ........... 455/69 |
| 5,634,206 A | * 5/1997 | Reed et al. ............. 455/277.1 |
| 5,670,964 A | * 9/1997 | Dent .......................... 342/457 |
| 5,710,981 A | * 1/1998 | Kim et al. ................... 455/69 |
| 5,778,030 A | 7/1998 | Bruckert et al. |
| 5,857,155 A | * 1/1999 | Hill et al. ................... 455/456 |
| 5,896,411 A | * 4/1999 | Ali et al. .................... 375/200 |
| 5,924,040 A | * 7/1999 | Trompower ................ 455/456 |
| 6,035,209 A | * 3/2000 | Tiedemann, Jr. et al. ... 455/522 |
| 6,115,580 A | * 9/2000 | Chuprun et al. ............... 455/1 |
| 6,144,841 A | * 11/2000 | Feeney ......................... 455/69 |
| 6,181,738 B1 | * 1/2001 | Chheda et al. .............. 375/224 |
| RE37,669 E | * 4/2002 | Kawano ..................... 455/436 |

FOREIGN PATENT DOCUMENTS

| WO | 9603813 | 2/1996 | |
| WO | 96/3104 | * 10/1996 | |
| WO | 9631014 | 10/1996 | |
| WO | WO98/09384 | * 3/1998 | ........... H04B/7/005 |

OTHER PUBLICATIONS

Yu et al. (US 2002/0018453 A1), "Method for Controlling Outer Loop Power", Feb. 14, 2002.*

* cited by examiner

*Primary Examiner*—Vivian Chin
*Assistant Examiner*—Charles N. Appiah
(74) *Attorney, Agent, or Firm*—Philip R. Wadsworth; Charles D. Brown; George C Pappas (57) ABSTRACT

A method and apparatus for dynamically adjusting a power control loop that attempts to maintain either the transmit power of a signal sent from a base station to a mobile station or the signal to noise ratio of a signal sent from the mobile station to the base station above a minimum threshold. Location information that is representative of the distance and morphology between the mobile station and the base station is determined. The minimum threshold of the power control loop is then adjusted in accordance with the location information such that the minimum threshold varies as the distance and the morphology between the mobile station and the base station change. A transmitter sends the signal at a power level that is controlled by the power control loop with the adjusted minimum threshold.

22 Claims, 4 Drawing Sheets

FIG. 1

MORPHOLOGIC REGIONS WITHIN CELL COVERAGE

FORWARD AND REVERSE LINK POWER CONTROL USING POSITION AND MOBILITY INFORMATION

BACKGROUND OF THE INVENTION

I. Field of the Invention

The present invention relates generally to mobile radio communication systems. More particularly, the present invention relates to power control systems for controlling the power level of signals sent on the forward links of a mobile radio communication system, and for controlling the signal to noise ratios of signals sent on the reverse links of a mobile radio communication system. Even more particularly, the present invention relates to a novel system and method that dynamically adjusts the parameters of forward and reverse link power control loops based upon the position and velocity of a mobile station.

II. Description of the Related Art

In mobile radio communication systems such as, for example, code division multiple access (CDMA) communication systems, the transmit power levels of signals sent between a base station and a mobile station are carefully controlled using power control loops. Typically, one power control loop is used to maintain the power level of signals on the forward link (i.e., signals sent from the base station to a mobile station) between a minimum and a maximum level. A different power control loop is similarly used to maintain the received signal to noise ratio of signals sent on the reverse link (i.e., the SNR measured at the base station of signals sent from a mobile station to the base station) between a minimum desired level and a maximum desired level. These power control loops typically adjust the transmit power of a signal upward or downward in fixed step wise increments (e.g., plus or minus 1 dB) in order to maintain either the power level or the signal to noise ratio of the signal between the minimum and maximum desired levels.

In early CDMA systems, forward link power control was typically accomplished using an open power control loop, whereas the reverse link power control system used a closed power control loop. Current CDMA systems use a closed power control loop for forward link power control and it is expected that future CDMA systems will continue to use a closed power control loop for forward link power control.

Each geographic cell in a mobile radio communication system is typically serviced by a base station associated with the cell. In current systems, the parameters of the forward link power control loop (i.e., the minimum power level, maximum power level, and step size associated with the forward link power control loop) and the limits of the reverse link power control loop (i.e., the minimum desired signal to noise ratio, maximum desired signal to noise ration, and step size associated with the reverse link power control loop) do not vary as the location and velocity of mobile units within the cell varies.

The transmit power requirements of signals sent between a base station and a mobile station vary as the mobile station moves within a cell. For example, as the mobile station moves closer to the base station, less transmit power is often required on the reverse link to achieve the same signal-to-noise ratio of the received signal at the base station. Thus, as the mobile station moves closer to the base station, the transmit power on the reverse link can often be reduced while maintaining the same signal-to-noise ratio of the received signal at the base station. In addition, less transmit power is also often required when the mobile station is stationary or moving slowly (as opposed to moving quickly) to achieve the same signal-to-noise ratio of the received signal at the base station. Thus, as the mobile station slows down, the transmit power on the reverse link can often be reduced while maintaining the same signal-to-noise ratio of the received signal at the base station.

The capacity of a given mobile radio communication system is limited by the transmit power available to the base station and the signal to noise ratio requirement on the reverse link. Thus, the capacity of the system could be increased if the base station transmit power and/or the signal to noise ratio on the reverse link in the system are reduced. In view of this, it would be desirable to have a power control system that could dynamically adjust the parameters of the forward and reverse link power control loops in response to the changing position and/or speed of a mobile station, so as to conserve transmit power and increase cell capacity.

SUMMARY OF THE INVENTION

The present invention maximizes the capacity of a given cell by adjusting one or both limits of a power control loop based on the position of a mobile station within the cell. In one embodiment, the present invention dynamically adjusts the parameters of a power control loop that attempts to maintain the transmit power of a signal sent from a base station to a mobile station above a minimum threshold. In this embodiment, location information that is representative of the distance and the morphology between the mobile station and the base station is determined. The minimum threshold of the power control loop is then adjusted in accordance with the location information such that the minimum threshold varies as the distance and the morphology between the mobile station and the base station change. A transmitter then transmits the signal at a power level that is controlled by the power control loop with the adjusted minimum threshold. This aspect of the invention can be used for controlling the minimum power level associated with the forward link power control loop.

In a further embodiment, the present invention dynamically adjusts the parameters of a power control loop that attempts to maintain the signal to noise ratio of a signal sent from the mobile station to the base station above a minimum threshold. In this embodiment, location information that is representative of the distance and the morphology between the mobile station and the base station is determined. The minimum threshold of the power control loop is then adjusted in accordance with the location and the morphology information such that the minimum threshold varies as the distance and the morphology between the mobile station and the base station change. A transmitter then transmits the signal at a power level that is controlled by the power control loop with the adjusted minimum threshold. This aspect of the invention can be used for controlling the minimum desired signal to noise ratio (i.e., the minimum desired signal to noise ratio of a reverse link signal received at the base station) in a reverse link power control loop.

In accordance with further alternative embodiments, the present invention also determines velocity information that is representative of the velocity of the mobile station. In these embodiments, the minimum threshold of a power control loop is adjusted based on the velocity information alone or, alternatively, the minimum threshold of the power control loop is adjusted based on both the velocity information and the current position of the mobile station. This aspect of the invention can also be used for controlling the minimum thresholds associated with both the forward and reverse link power control loops, and is especially useful in mixed wireless networks where there are both fixed position wireless users (also referred to as wireless local loop users) and mobile wireless users (i.e., wireless users that change position.) In such mixed wireless networks, adjustment of the minimum thresholds associated with both the forward and reverse link power control loops based on the velocity of wireless user ensures efficient allocation of system resources.

In accordance with a still further aspect, the maximum threshold of a forward link power control loop (i.e., the power level below which the power control loop attempts to maintain the transmit power of the signal sent from the base station) is also adjusted in accordance with the location information (and optionally the velocity information) such that the maximum threshold varies as the distance and the morphology between the mobile station and the base station (and optionally the velocity of the mobile station) vary.

In accordance with yet a further aspect, the maximum threshold of a reverse link power control loop (i.e., the maximum desired signal to noise ratio below which the power control loop attempts to maintain the signal to noise ratio of a reverse link signal received at a base station) is also adjusted in accordance with the location information (and optionally the velocity information) such that the maximum threshold varies as the distance and the morphology between the mobile station and the base station (and optionally the velocity of the mobile station) vary.

In accordance with a still further aspect, the step size of a power control loop (i.e., the step wise power increment used in the power control loop to adjust the transmit power of the signal upward or downward) is also adjusted in accordance with the velocity information such that the step size varies as the velocity of the mobile station varies. In accordance with this aspect, the step size used by the power control loop is preferably reduced for stationary or slow moving mobile stations, and the step size is increased when a mobile station begins moving more quickly. This aspect of the invention can be used for controlling the step size of either a forward link or reverse link power control loop.

BRIEF DESCRIPTION OF THE DRAWINGS

In order that the invention can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and details through the use of the accompanying drawings in which.

DETAILED DESCRIPTION OF THE PREFERRED EMBODIMENT

Figure 1:
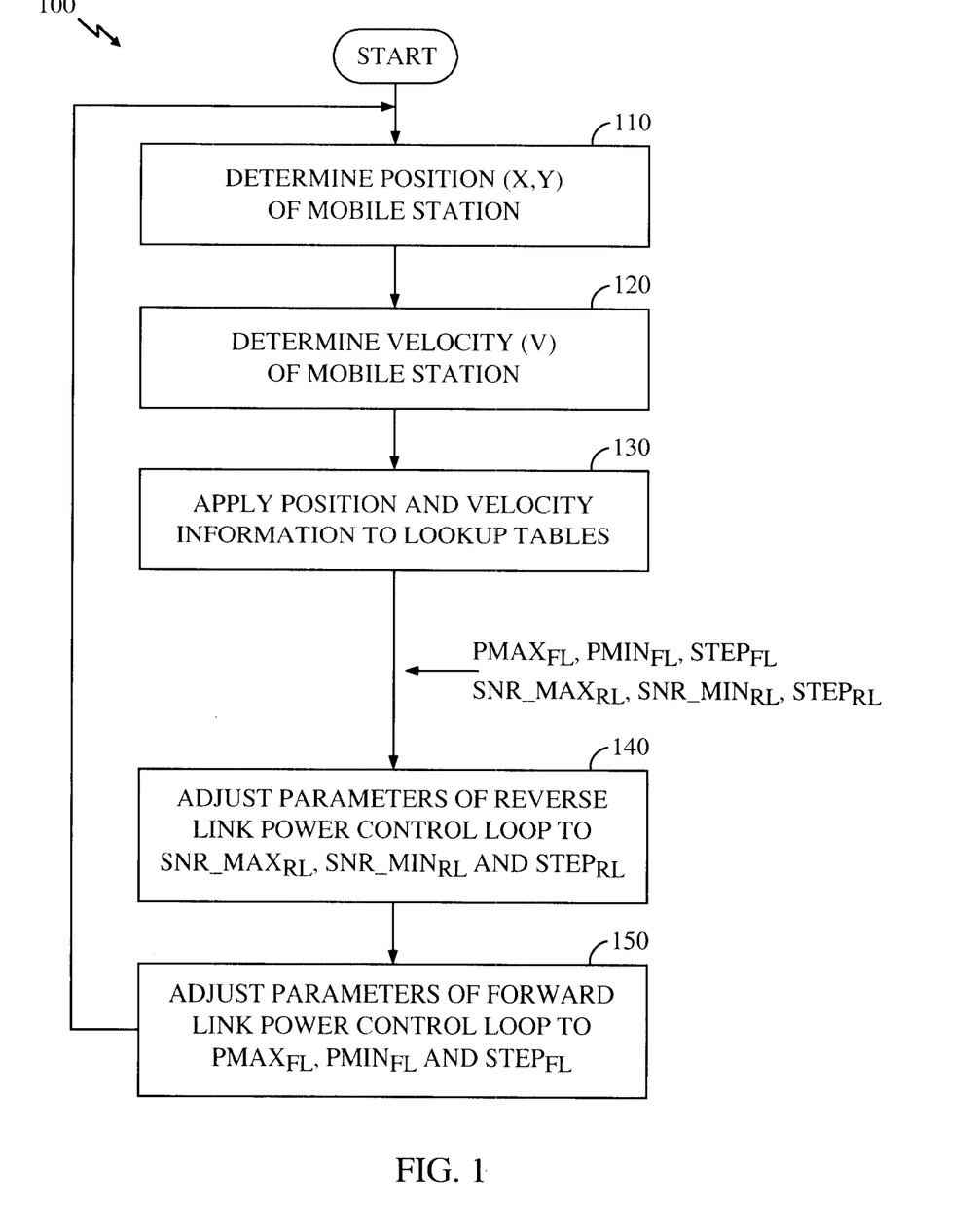
FIG. 1 is a flow diagram of a method for adjusting the minimum and maximum limits of the forward and reverse link power control loops in a mobile radio communication system, in accordance with a preferred embodiment of the present invention.

Referring now to FIG. 1, there is shown a flow diagram of a method for adjusting the minimum limits, maximum limits, and step size increments of the forward and reverse link power control loops in a mobile radio communication system, in accordance with a preferred embodiment of the present invention. In step 110, a position P(x, y) of the mobile station is determined using, for example, measurements from both the Global Positioning Satellite (GPS) system and the system infrastructure. The position of the mobile station is preferably determined in this step using differential GPS and in accordance with the method disclosed in U.S. patent application Ser. No. 09/040,501, entitled "System and Method for Determining The Position of a Wireless CDMA Transceiver," filed Mar. 17, 1998, which is owned by the assignee of the present invention, and the contents of which is incorporated herein in their entirety by reference. In an alternate embodiment, the position of the mobile station can be determined using at least three (and preferably more) terrestrial base stations in the system infrastructure.

In step 120, the motion of the mobile station is modeled (preferably using past positional measurements) in order to estimate the current velocity (or a range of potential velocities) of the mobile station. Map information, which places the mobile station on a street or highway, which is oriented in a known direction, may also be used to model the current velocity of the mobile station. Filtering methods can further enhance this trajectory estimation technique. A good example is to use a Kalman filter to adaptively track the mobile trajectory and hence predict its dynamic state in terms of speed and position.

In step 130, the position of the mobile station is applied to a look up table associated with a cell (such as Table I below) in order to determine the upper and lower limits of the forward and reverse link power control loops.

TABLE I

| Position Information | | Forward Link PC Loop Limits | | Reverse Link PC Loop Limits | |
|---|---|---|---|---|---|
| Lon-gi-tude | Lat-itude | Power Ceiling | Power Floor | Desired SNR Maximum | Desired SNR Minimum |
| $x_1$ | $y_1$ | $PMAX1_{FL}$ | $PMIN1_{FL}$ | $SNR\_MAX1_{RL}$ | $SNR\_MIN1_{RL}$ |
| $x_2$ | $y_2$ | $PMAX2_{FL}$ | $PMIN2_{FL}$ | $SNR\_MAX2_{RL}$ | $SNR\_MIN2_{RL}$ |
| $x_3$ | $y_3$ | $PMAX3_{FL}$ | $PMIN3_{FL}$ | $SNR\_MAX3_{RL}$ | $SNR\_MIN3_{RL}$ |
| $x_4$ | $y_4$ | $PMAX4_{FL}$ | $PMIN4_{FL}$ | $SNR\_MAX4_{RL}$ | $SNR\_MIN4_{RL}$ |

In one embodiment, the power control loop values stored in the table are determined empirically by collecting data reflecting the power requirements of a mobile user as the user moves to different locations within a cell. For example, the data can be collected by giving a mobile station with position location capability to a postman and monitoring the power requirements of the mobile station as the post man moves about the cell making postal deliveries. In this embodiment, the forward link power levels and the reverse link signal to noise ratio are monitored and stored at different locations in the cell as the mobile station moves about the cell. Thereafter, for each location or region in the cell being monitored, the $SNR\_MAX_{RL}$ and $SNR\_MIN_{RL}$ values—which represent the minimum and maximum desired signal to noise ratios associated with the reverse link power control loop to be applied at the location or region—are select by, for example, adding and subtracting predetermined margins from the reverse link signal to noise ratio of the reverse link signal that was measured at the base station when the mobile station was in the location or region. In other words, the $SNR\_MAX_{RL}$ value for the region will be set by adding a predetermined margin of dB to the reverse link signal to noise ratio that was measured at the base station when the mobile station was in the location or region, and the $SNR\_MIN_{RL}$ value for the region will be set by subtracting a predetermined margin of dB from the reverse link signal to noise ratio that was measured at the base station when the mobile station was in the location or region. Similarly, for each location or region in the cell being monitored, the $PMAX_{FL}$ and $PMIN_{FL}$ values—which represent the power ceiling and floor of the forward link power control loop to be applied at the location or region—are selected by, for example, adding and subtracting predetermined power margins from the measured forward link power level in the location or region. In other words, the $PMAX_{FL}$ value for the region will be set by adding a predetermined margin of dB to the forward link power level that was measured when the mobile station was in the location or region, and the $PMIN_{FL}$ value for the region will be set by subtracting a predetermined margin of dB from the forward link power level that was measured when the mobile station unit was in the location or region.

In step 130, after the $PMAX_{FL}$, $PMIN_{FL}$, $SNR\_MAX_{RL}$ and $SNR\_MIN_{RL}$ values are selected from the look up table, the values are adjusted based on the velocity of the mobile station. This aspect of the invention recognizes that low mobility users (e.g., mobile stations moving at less than 5 mph or pedestrian speed) will experience less fading than higher mobility users and that, as a result, the forward and reverse links associated with lower mobility users can operate within tighter power control limits. In accordance with this aspect of the invention, in cases where the user is moving below a predetermined speed such as 5 mph, a predetermined amount (e.g., 2 dB) is subtracted from the $PMAX_{FL}$ and $SNR\_MAX_{RL}$ values and a predetermined amount (e.g., 2 dB) is added to the $PMIN_{FL}$ and $SNR\_MIN_{RL}$ values before the $PMAX_{FL}$, $PMIN_{FL}$, $SNR\_MAX_{RL}$ and $SNR\_MIN_{RL}$ values are applied to the power control loops in steps 140 and 150. This aspect of the invention similarly recognizes that high mobility users (e.g., mobile stations moving at more than 35 mph) will experience more fading than lower mobility users and that, as a result, the forward and reverse links associated with such higher mobility users should operate within wider power control limits. In accordance with this aspect of the invention, in cases where the user is moving above a predetermined speed such as, for example, 35 mph, a predetermined amount (e.g., 2 dB) is added to the $PMAX_{FL}$ and $SNR\_MAX_{RL}$ values and a predetermined amount (e.g., 2 dB) is subtracted from the $PMIN_{FL}$ and $SNR\_MIN_{RL}$ values before the $PMAX_{FL}$, $PMIN_{FL}$, $SNR\_MAX_{RL}$ and $SNR\_MIN_{RL}$ values are applied to the power control loops in steps 140 and 150.

Adjustment of the $PMAX_{FL}$, $PMIN_{FL}$, $SNR\_MAX_{RL}$ and $SNR\_MIN_{RL}$ based on the velocity of the mobile station as is done in step 130 is especially important in mixed wireless networks where there are both fixed position wireless users (also referred to as wireless local loop users) and mobile wireless users (i.e., wireless users that change position.) In such mixed wireless networks, adjustment of the minimum thresholds associated with both the forward and reverse link power control loops based on the velocity of the wireless users ensures efficient allocation of system resources. For purposes of the present invention, the term "mobile station" shall refer to a mobile station such as mobile station 300 shown in FIG. 3, regardless of whether the user of such station is a fixed position wireless user or a mobile wireless user.

In step 130, the velocity of the mobile station is also applied to a second look up table (such as Table II below) in order to determine the power adjustments step sizes to be used in the forward and reverse link power control loops:

TABLE II

| Velocity Information | Forward Link PC Loop Step Size | Reverse Link PC Loop Step size |
|---|---|---|
| $0 < \text{Velocity} < v_1$ | $STEP1_{FL}$ | $STEP1_{RL}$ |
| $v_1 < \text{Velocity} < v_2$ | $STEP2_{FL}$ | $STEP2_{RL}$ |
| $v_2 < \text{Velocity}$ | $STEP3_{FL}$ | $STEP3_{RL}$ |

The values stored in Table II preferably reflect that a smaller step size will be required to adequately maintain the power or signal to noise ratio of a signal within predetermined limits in cases where the mobile station is moving more slowly. Where $v_1$ and $v_2$ are equal to 5 mph and 35 mph, respectively, exemplary values for $STEP1_{RL}$, $STEP2_{RL}$ and $STEP3_{RL}$ are 0.25 dB, 0.5 dB and 1.0 dB, and exemplary values of for $STEP1_{FL}$, $STEP2_{FL}$ and $STEP3_{FL}$ are __, __ and 1 times the normal power increment step size on the forward link power control loop. Use of this aspect of the invention reduces the power fluctuations on the forward and reverse links by keeping at a minimum the size of each power adjustment made by the power control loops.

Although in the embodiment described above, the power control loop parameters were adjusted in step 130 by predetermined amounts based on the velocity of the mobile station, it will be understood by those skilled in the art that the particular amounts used to adjust the power control loop parameters represent a matter of design choice and that optimal values may be determined using empirical data for a given cell.

In steps 140 and 150, the $PMAX_{FL}$, $PMIN_{FL}$, $SNR\_MAX_{RL}$ and $SNR\_MIN_{RL}$ values from the first look up table (which have been adjusted based on the mobility of the mobile station) are applied to the forward and reverse link power control loops and used as the upper and lower power limits of these control loops. Similarly, the $STEP_{RL}$ and $STEP_{FL}$ values from the second look up table are applied to the forward and reverse link power control loops and used as the step size used for power adjustment by these control loops. The process shown in FIG. 1 is preferably repeated at regular intervals so that the power control loops are regularly updated as a mobile station moves about a cell and/or its mobility varies.

Although in the preferred embodiment of the present invention, the $PMAX_{FL}$, $PMIN_{FL}$, $SNR\_MAX_{RL}$ and $SNR\_MIN_{RL}$ values from the look up table are adjusted based on the mobility (or velocity) of the mobile station before being applied to the forward and reverse link power control loops, in alternative embodiments the $PMAX_{FL}$, $PMIN_{FL}$, $SNR\_MAX_{RL}$ and $SNR\_MIN_{RL}$ values from the look up table may be applied to the forward and reverse link power control loops without any adjustment based on the mobility (or velocity) of the mobile station. In further alternate embodiments of the present invention, the $PMAX_{FL}$, $PMIN_{FL}$, $SNR\_MAX_{RL}$ and $SNR\_MIN_{RL}$ values may be adjusted based only on the mobility or velocity of the mobile station (and not the location of the mobile station within the cell) before being applied to the forward and reverse link power control loops by making the $PMAX_{FL}$, $PMIN_{FL}$, $SNR\_MAX_{RL}$ and $SNR\_MIN_{RL}$ values in the look up table location independent (i.e., in these embodiments the values in the table are set so that they do not vary based on position of the mobile station within the cell).

Figure 2:
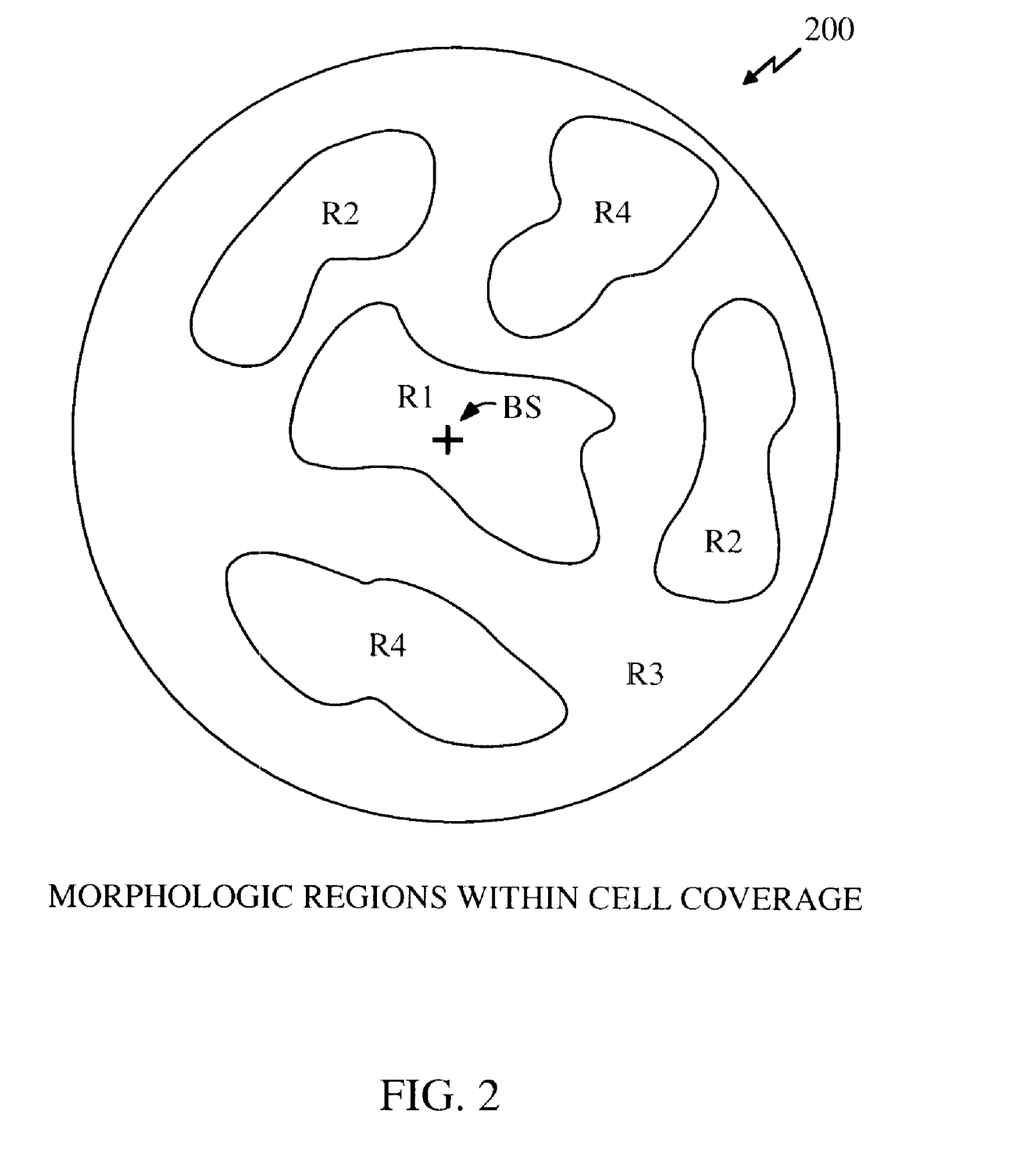
FIG. 2 is a map showing a cell with several geographical regions each of which has a different minimum power threshold associated therewith for controlling the transmit power of reverse link signals transmitted from such regions to a base station, in accordance with a preferred embodiment of the present invention.

Referring now to FIG. 2, there is shown a map of a cell 200 with several geographical regions (R0, R1, R2 and R3) each of which has different minimum and maximum thresholds associated therewith for controlling the transmit power of forward and reverse link signals transmitted from such regions to a base station. In this embodiment, the limits of the forward and reverse link power control loops vary in a stepwise manner based on regions within the cell. Thus, one set of $PMAX_{FL}$, $PMIN_{FL}$, $SNR\_MAX_{RL}$ and $SNR\_MIN_{RL}$ values will be extracted from the look up table in step 130 whenever the mobile station is operating in region R0, a second set of $PMAX_{FL}$, $PMIN_{FL}$, $SNR\_MAX_{RL}$ and $SNR\_MIN_{RL}$ values will be extracted from the look up table whenever the mobile station is operating in region R1, and so on. It will be understood by those skilled in the art that the $PMAX_{FL}$, $PMIN_{FL}$, $PSN\_MAX_{RL}$ and $SNR\_MIN_{RL}$ values could alternatively vary in a more continuous or less regular manner as a function of the distance of the mobile station from the center of the cell.

Figure 3:
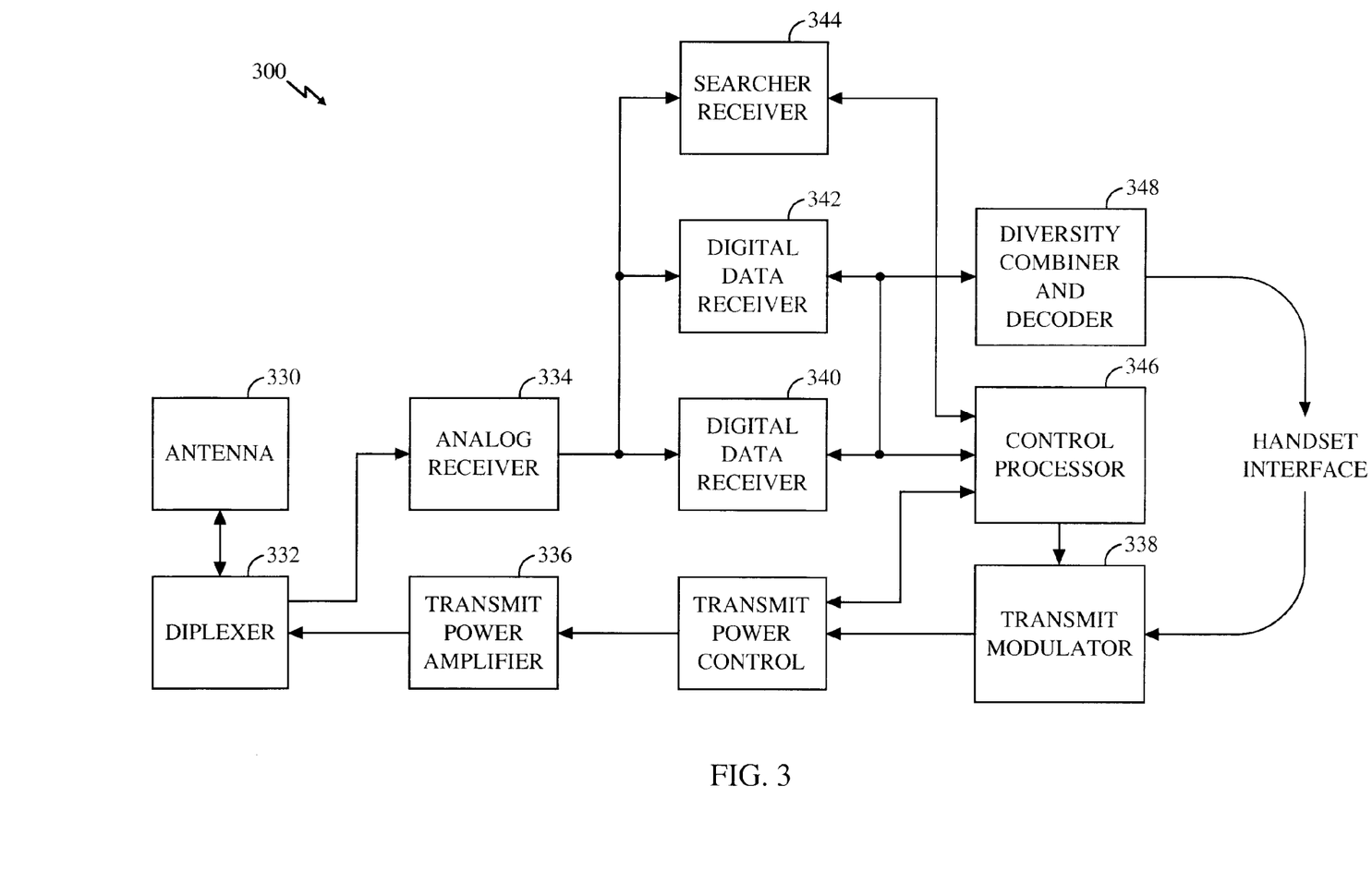
FIG. 3 is a block diagram showing the components of an exemplary CDMA mobile station used to implement the power control systems of the present invention.

Referring now to FIG. 3, there is a block diagram showing the components of an exemplary code division multiple access (CDMA) mobile station 300 used for implementing the power control systems of the present invention. The mobile station includes an antenna system 330, which is coupled through diplexer 332 to analog receiver 334 and transmit power amplifier 336. Antenna system 330 and diplexer 332 are of standard design and permit simultaneous reception and transmission through one or more antennae. Antenna system 330 optionally includes one antenna for voice traffic, and a separate antenna for receiving GPS signals. Antenna system 330 collects signals transmitted to the mobile station from one or more base stations and the GPS system, and provides the signals though diplexer 332 to analog receiver 334. Receiver 334 is also provided with an analog to digital converter (not shown). Receiver 334 receives RF signals from diplexer 332, amplifies and frequency downconverts the signals, and provides a digitized output signal to digital data receivers 340, 342 and to search receiver 344. It will be understood that, although in the embodiment in FIG. 3 only two digital data receivers are shown, a low performance mobile station might have only a single digital data receiver while higher performance units will have two or more digital data receivers to permit diversity reception. The outputs of receivers 340 and 342 are provided to diversity and combiner circuitry 348 which time adjusts the two streams of data received from the receivers 340 and 342, adds the streams together and decodes the result. Details concerning the operation of the digital data receivers 340, 342, the search receiver 344, and the diversity combiner and decoder circuitry 348 are described in U.S. Pat. No. 5,101,501 entitled "Method and Apparatus for Providing A Soft Handoff In Communications In A CDMA Cellular Telephone System", which is assigned to the assignee of the present invention and incorporated herein by reference.

An output signal is provided from the decoder 348 to control processor 346. The output signal from the decoder will include, for example, any pilot signals from the base stations that will be used for making positional measurements, timing signals received from the GPS system, and other information such as modeling information and base station position information sent from a base station to the mobile unit. In response to this information, the control processor 346 determines the forward and/or reverse link power control parameters in accordance with the method shown in FIG. 1 and the reverse link power control parameters are used with the power control unit in the mobile station to control the power level of the reverse link signals from the mobile station. All the steps shown in FIG. 1 are preferably implemented in software on control processor 346; however, it will be understood by those skilled in the art that many of these steps could alternatively be implemented in the system infrastructure.

Figure 4:
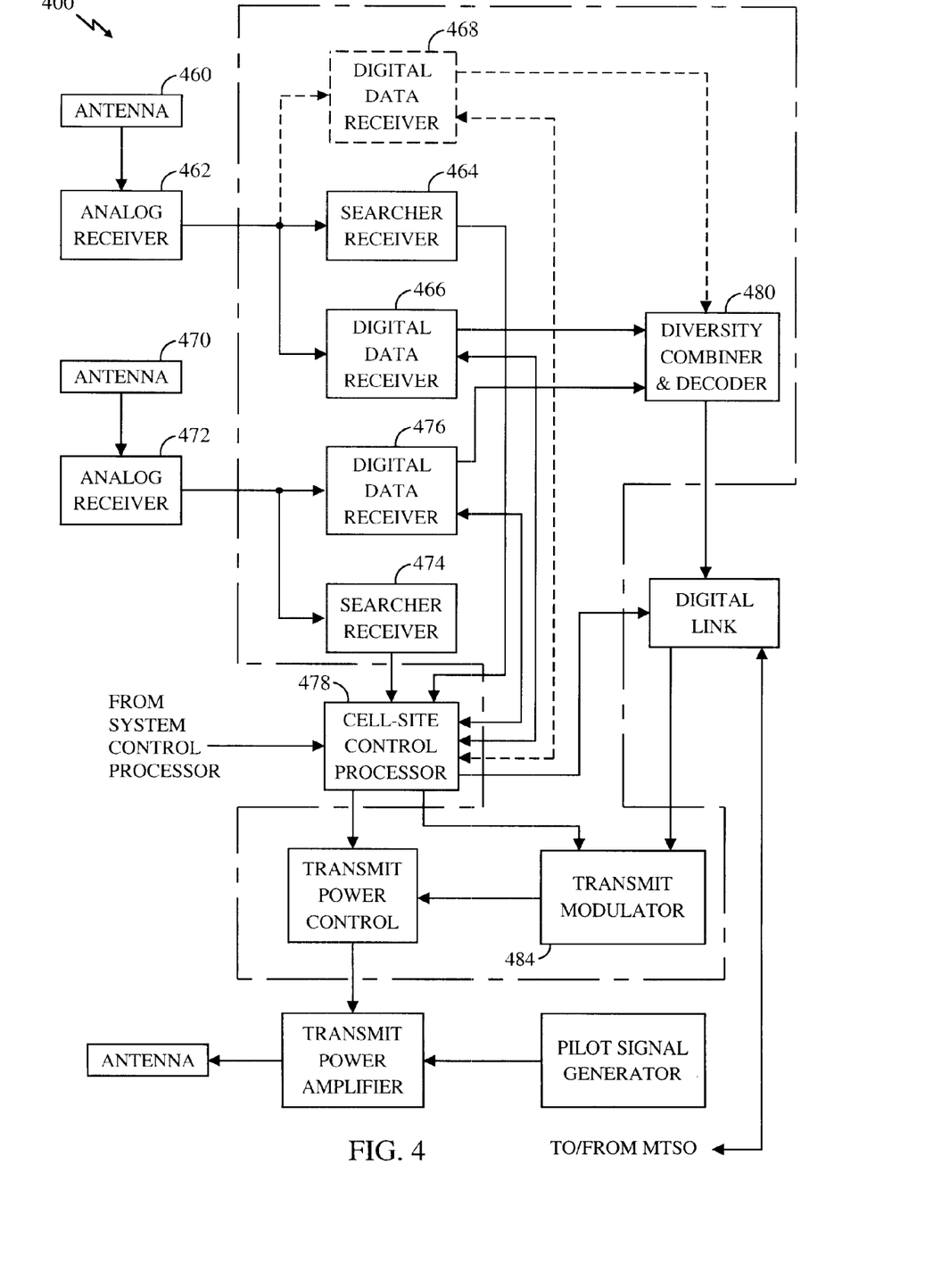
FIG. 4 is a block diagram showing the components of an exemplary CDMA base station used to implement the power control systems of the present invention.

Referring now to FIG. 4, there is shown a block diagram of the components of an exemplary CDMA base station 400 used for implementing the forward and reverse link power control systems of the present invention. At the base station, two receiver systems are utilized with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 4, the first receiver system is comprised of antenna 460, analog receiver 462, searcher receiver 464 and digital data receivers 466 and 468. The second receiver system includes antenna 470, analog receiver 472, searcher receiver 474 and digital data receiver 476. Cell-site control processor 478 is used for signal processing and control. Among other things, cell site processor 478 monitors the signals sent to and received from a mobile station in order to determine the position information used in the present, invention, and this processor is also preferably used for performing the modeling of the mobile velocity in step 120. Cell site processor 478 optionally determines the forward and/or reverse link power control parameters in accordance with the method shown in FIG. 1, and the forward link power control parameters are used with the power control unit in the base station to control the power level of the forward link signals from the base station.

Both receiver systems are coupled to diversity combiner and decoder circuitry 480. A digital link 482 is used to communicate signals from and to a base station controller or data router under the control of control processor 478. Signals received on antenna 460 are provided to analog receiver 462, where the signals are amplified, frequency translated and digitized in a process identical to that described in connection with the mobile station analog receiver. The output from the analog receiver 462 is provided to digital data receivers 466 and 468 and searcher receiver 464. The second receiver system (i.e., analog receiver 472, searcher receiver 474 and digital data receiver 476) processes the received signals in a manner similar to the first receiver system. The outputs of the digital data receivers 466, 476 are provided to diversity combiner and decoder circuitry 480, which processes the signals in accordance with a decoding algorithm. Details concerning the operation of the first and second receiver systems and the diversity combiner and decoder 980 are described in U.S. Pat. No. 5,101,501 entitled "Method and Apparatus for Providing A Soft Handoff In Communications In A CDMA Cellular Telephone System", incorporated above. Signals for transmission to mobile units are provided to a transmit modulator 484 under the control of processor 478. Transmit modulator 484 modulates the data for transmission to the intended recipient mobile station.

Although the present invention has been described in connection with mobile radio communication systems that use CDMA modulation for transmitting signals between the mobile station and the base stations in the system, it will be understood by those skilled in the art that the teachings of the present invention could be applied in mobile radio communications that use other modulation methods such as, for example, time division multiple access modulation, for communicating between the mobile station and base stations in the system.

The previous description of the preferred embodiments is provided to enable any person skilled in the art to make or use the present invention. Various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. In a mobile station for use in a CDMA wireless communication system having at least one base station and characterized by a reverse links power control loop, a method comprising:
   identifying a current position of the mobile station;
   selecting at least one of an upper limit signal to noise ratio (SNR) and a lower limit SNR associated with the reverse link power control on the basis of the current position;
   identifying a current velocity of the mobile station; and
   dynamically adjusting the selected at least one of an upper limit SNR and the lower limit SNR on the basis of the current velocity.

2. The method of claim 1, wherein the selecting and dynamically adjusting is performed using pre-defined lookup tables.

3. The method of claim 1, wherein a geographic cell is characterized by a plurality of different regions serviced by a base station, identifying a current position involves identifying a region in a geographic cell the mobile station is presently located.

4. The method of claim 1, wherein the identifying of the current position is determined using differential GPS.

5. The method of claim 1, wherein the identifying of the current position is determined using terrestrial base stations, alone or in combination with GPS information.

6. The method of claim 1, wherein dynamically adjusting further involves using the current velocity to redefine a power adjustment step.

7. The method of claim 6, wherein identifying current velocity is determined by modeling, using the current position and at least one of past positional measurements, map information, and filtering.

8. The method of claim 6, wherein the redefining of the power adjustment step involves identifying a range of velocities including the current velocity, and determining an associated power adjustment step associated with the identified range using a pre-defined look-up table.

9. The method of claim 6, wherein a geographic cell is characterized by plurality of different regions serviced by a base station, the identifying a current position involves identifying a region in a geographic cell the mobile station is presently located.

10. In a base station for use in a CDMA wireless communication system servicing at least one mobile station and characterized by a forward link power control loop, a method comprising:
    identifying a current position of the mobile station;
    selecting at least one of an upper limit signs to noise ratio (SNR) and a lower limit SNR associated with the forward link power control on the basis of the current position;
    identifying a current velocity of the mobile station; and
    dynamically adjusting the selected at least one of an upper limit SNR and the lower limit SNR on the basis of the current velocity.

11. The method of claim 10, wherein the selecting and dynamically adjusting is performed using predefined look-up tables.

12. The method of claim 10, wherein a geographic cell is characterized by a plurality of different regions serviced by a base station, identifying a current position involves identifying a region in a geographic-cell the mobile station is presently located.

13. The method of claim 10, wherein the identifying of the current position is determined using differential GPS.

14. The method of claim 10, wherein the identifying of the current position is determined using terrestrial base stations, alone or in combination with CPS information.

15. The method of claim 10, wherein dynamically adjusting further involves using the current velocity to redefine a power adjustment step.

16. The method of claim 15, wherein identifying current velocity is determined by modeling, using the current position and at least one of past positional measurements, map information, and filtering.

17. The method of claim 15, wherein the redefining of the power adjustment step involves identifying a range of velocities including the current velocity, and determining an associated power adjustment step associated with the identified range using a pre-defined look-up table.

18. The method of claim 15, wherein a geographic cell is characterized by plurality of different regions serviced by a base station, the identifying a current position involves identifying a region in a geographic cell the mobile station is presently located.

19. A mobile station for use in a CDMA wireless communication system having at least one base station and characterized by a reverse link power control loop, comprising:
    means for identifying a current position of the mobile station;
    means for selecting at least one of an upper limit signal to noise ratio (SNR) and a lower limit SNR associated with the reverse link power control on the basis of the current position;
    means for identifying a current velocity of the mobile station; and
    means for dynamically adjusting the selected at least one of an upper limit SNR and the lower limit SNR on the basis of the current velocity.

20. A base station for use in a CDMA wirless communication system servicing least one mobile station and characterized by a forward link power control loop, comprising:
    means for identifying a current position of the mobile station;
    means for selecting at least one of an upper limit signal to noise ratio (SNR) and a lower limit SNR associated with the forward link power control on the basis of the current position;

means for identifying a current velocity of the mobile station; and means for dynamically adjusting the selected at least one of an upper limit SNR and the lower limit SNR on the basis of the current velocity.

21. A software readable media having instructions, operable by a mobile station serviced by a base station by way of a reverse link power control loop, for:

identifying a current position of the mobile station;

selecting at least one of an upper limit signal to noise ratio (SNR) and a lower limit SNR associated with the reverse link power control on the basis of the current position;

identifying a current velocity of the mobile station; and dynamically adjusting the selected at least one of an upper limit SNR and the lower limit SNR on the basis of the current velocity.

22. A software readable media having instructions, operable by a CDMA station servicing at least one mobile station by way of a forward link power control loop, for:

identifying a current position of the mobile station;

selecting at least one of an upper limit signal to noise ratio (SNR) and a lower limit SNR associated with the forward link power control on the basis of the current position;

identifying a current velocity of the mobile station; and dynamically adjusting the selected at least one of an upper limit SNR and the lower limit SNR on the basis of the current velocity.

* * * * *